(12) United States Patent
Liebenow (10) Patent No.: US 7,716,709 B2
(45) Date of Patent: May 11, 2010

(54) METHOD OF INCREASING CAPABILITIES OF STREAMING CONTENT INCLUDING VIDEO ON DEMAND

(75) Inventor: Frank Liebenow, Jefferson, SD (US)

(73) Assignee: Gateway, Inc., N. Sioux City, SD (US)

( * ) Notice: Subject to any disclaimer, the term of this patent is extended or adjusted under 35 U.S.C. 154(b) by 1748 days.

(21) Appl. No.: 10/857,397

(22) Filed: May 28, 2004

(65) Prior Publication Data

US 2004/0221055 A1   Nov. 4, 2004

Related U.S. Application Data

(63) Continuation-in-part of application No. 09/474,595, filed on Dec. 29, 1999, now abandoned.

(51) Int. Cl.
    *H04N 7/173* (2006.01)

(52) U.S. Cl. .................................... 725/97; 725/101
(58) Field of Classification Search ............ 725/86–101
    See application file for complete search history.

(56) References Cited

U.S. PATENT DOCUMENTS 5,426,699 A * 6/1995 Wunderlich et al. ......... 380/211
5,682,597 A * 10/1997 Ganek et al. ............... 455/3.04

* cited by examiner

*Primary Examiner*—Dominic D Saltarelli (57) ABSTRACT

A system and method for increasing capabilities of streaming content including video on demand to multiple users are provided. The system includes a central broadcast station and at least two user locations for receiving streaming content from the central broadcast station. Each user location includes receiving equipment capable of tuning into more than one channel simultaneously and capable of capturing content from a first channel in a first in first out buffer as it presents content from a second channel.

14 Claims, 8 Drawing Sheets

Fig. 8

METHOD OF INCREASING CAPABILITIES OF STREAMING CONTENT INCLUDING VIDEO ON DEMAND

REFERENCE TO RELATED APPLICATION

This application is a continuation-in-part of U.S. patent application Ser. No. 09/474595, filed Dec. 29, 1999, now abandoned pending.

FIELD

The present invention relates generally to data processing systems and more particularly to a system and method for increasing the capabilities of streaming content.

BACKGROUND

With the advent of increased access to computers, home entertainment systems, and networks such as the Internet and the World Wide Web (WWW), it has become increasingly common for a wide variety of providers to present to multiple users content on demand. Such content includes but is not limited to streaming video, audio and/or data. Such content is also increasingly common to shared receiving systems serving multiple living units such as hotels and the like. Video on Demand (VOD) is a streaming content service enabling a user to obtain video information immediately in real time through a request terminal. This is contrasted with pay per view, where the user must abide by the schedule of a program provider.

In a typical streaming application such as video on demand, each user has the opportunity to view any particular content starting at random times. Each user gets a complete download of the content they have selected. Each user receives streaming content on a channel which is typically dedicated solely to the content the particular user is viewing. In systems with many potential viewers, many channels and a large amount of bandwidth are required. As the amount of required bandwidth increases, costs associated with providing the bandwidth increase as well. Practical limits on bandwidth result in a limited amount of bandwidth availability for multiple channels.

When bandwidth is limited, especially in broadcast media, the number of users able to share the bandwidth is limited to the number of unique channels allocated to the system. Even if multiple users want to access the same content, a unique download is required since there is little probability that two users will start the same content at the same time.

SUMMARY

The present invention overcomes problems of the prior art by providing in various embodiments a system and method of increasing capabilities of streaming content including video on demand.

A system and method for increasing capabilities of streaming content including video on demand to multiple users includes in one embodiment a central broadcast station and at least two user locations for receiving streaming content from the central broadcast station. Each user location comprises receiving equipment capable of tuning to more than one channel simultaneously and capable of capturing content from a first channel as it presents content from a second channel.

A method embodiment for providing streaming content while conserving bandwidth includes receiving a program at a first user station on a first channel, and receiving a first portion of the program at a second user station on a second channel while a second portion of the program is captured in a FIFO buffer. The second portion of the program is presented to the second channel from the FIFO buffer after the first portion of the program is completed. The second channel is freed for other use after transmitting begins.

Other embodiments are described and claimed.

DESCRIPTION OF EMBODIMENTS

In the following detailed description of sample embodiments, reference is made to the accompanying drawings which form a part hereof, and which are shown by way of illustration specific embodiments in which the invention may be practiced. These embodiments are described in sufficient detail to enable those skilled in the art to practice the invention, and it is to be understood that other embodiments may be utilized and logical, structural, electrical, and other changes may be made without departing from the scope of the present invention.

Figure 1:
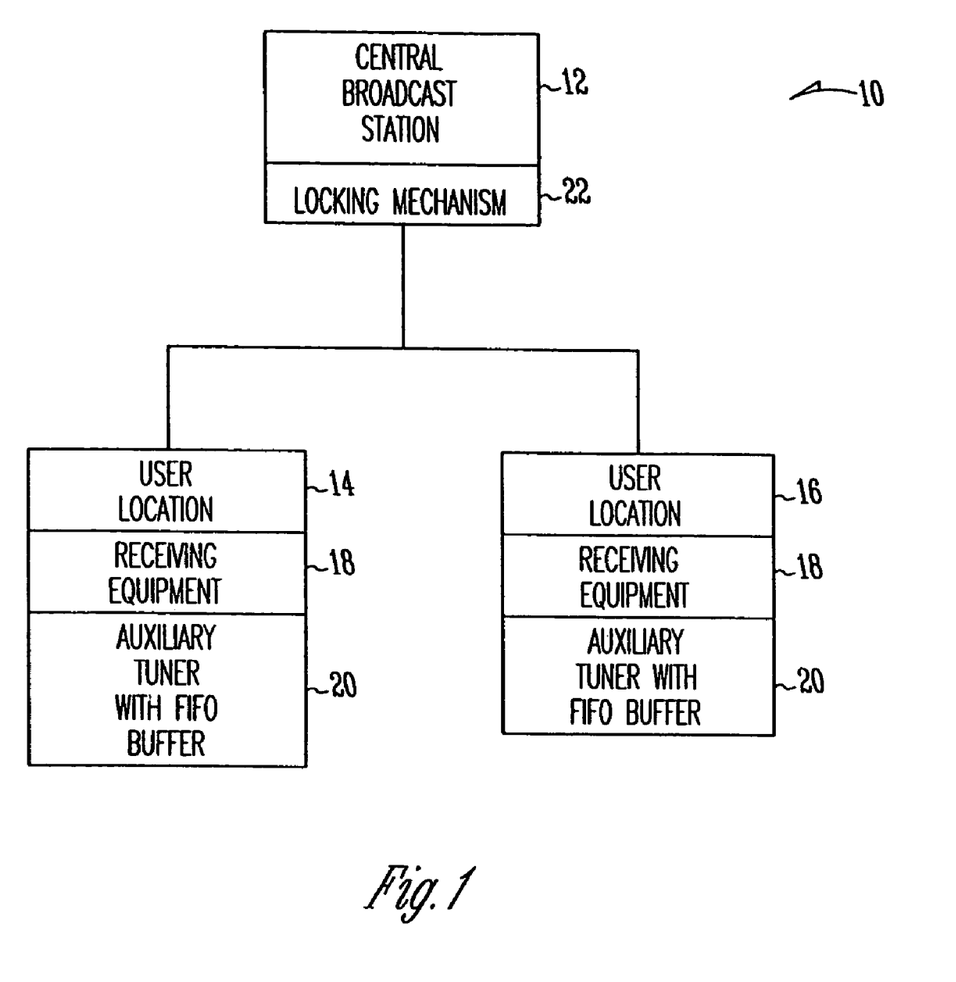
FIG. 1 is a block diagram showing the major components of an embodiment of the present invention.

In one embodiment, the present invention is a system 10 for providing streaming content such as video on demand to multiple users. Referring to FIG. 1, the system 10 comprises a central broadcast station 12 and at least two user locations 14, 16, for receiving streaming content from the central broadcast station. Each user location comprises receiving equipment 18 capable of tuning into more than one channel simultaneously and capable of capturing content from at least one content channel as it presents content from a channel other than the channel or channels from which it is capturing content. In one embodiment, each user location comprises an auxiliary tuner having a first in first out (FIFO) buffer 20 for capturing content from one of the channels.

In a further embodiment, the at least two user locations comprise a first user location and a second user location. The first user location is capable of receiving a program on a first channel. The second user location is capable of receiving a receiving a first portion of the program on a second channel while a second portion of the program is downloaded to the FIFO buffer of the second user location. The FIFO buffer is capable of transmitting the second buffered portion of the program to the user after the first portion of the program is completed, such that the second channel is freed for use after the transmitting begins.

In one embodiment, the system 10 further comprises a locking mechanism capable of ensuring that the second portion of the program is completely downloaded from the first channel to the FIFO buffer of the second user location even if the first user station stops receiving the program before it ends. The locking mechanism may include a counter for each channel, whereby each counter starts at zero and each time a user location starts tapping a given channel, the counter associated with that channel is incremented and each time a user location stops tapping a given channel, the counter associated with that channel is decremented. Once the counter reaches its terminal count, e.g., zero, the channel associated with that counter is free and can be used to download another program. In a further embodiment, the system comprises a third user station capable of receiving a third portion of the program on a third channel while a fourth portion of the program is downloaded to a FIFO buffer of the third user station. The FIFO buffer is capable transmitting the fourth portion of the program from the FIFO buffer after the third portion of the program is completed, such that the third channel is freed for use after the transmitting begins. This system in one embodiment comprises a locking mechanism capable of ensuring that the fourth portion of the program is completely downloaded from the first channel to the FIFO buffer of the third user location even if the first user station stops receiving the program before it ends.

It should be understood that the number of user locations can be increased without departing from the scope of the invention.

In another embodiment, each user location is capable of sending a request for streaming content to the central broadcast station, and the central broadcast station is capable of broadcasting requested streaming content to a first user location and a first channel and a second user location and a second user channel at different times. For example, at time T1 in response to a first request for streaming content from a first user location, the central broadcast station is capable of recognizing a second request by a second user for the same streaming content and begins to broadcast the content on a second channel at time T2. The central broadcast station is further capable of communicating to the auxiliary tuner at the second user location to capture content from the first channel in the FIFO buffer, such that the second user views a first portion of the requested content corresponding in length from time T1 to time T2 on a second channel while the auxiliary tuner captures a second portion of the content from the first channel starting at T2 to the end of the program in the FIFO buffer, such that the second user views the second portion of the content from the FIFO buffer after viewing the first portion of the content from the second channel. In this embodiment, the second channel is freed for use when the program shown on the second channel reaches requested content stored or captured in the FIFO buffer, thereby increasing available system bandwidth for use.

In a further embodiment, the system further comprises a locking mechanism 22 to ensure that the entire content of the program is downloaded from the first channel to the FIFO buffer of the auxiliary tuner of the second user location.

In one embodiment, the central broadcast station is capable of recognizing a third request by a third user for the same streaming content and begins to broadcast the content on a second channel at time T3. The central broadcast station is further capable of communicating to the auxiliary tuner at the third user location to capture content from the first channel in the FIFO buffer, such that the third user views a third portion of the requested content corresponding in length from T1 to T3 on a third channel while the auxiliary tuner captures a fourth portion of the content from the first channel starting at T3 to the end of the program in the FIFO buffer, and such that the third user views the fourth portion of the content from the FIFO buffer after viewing the third portion of the content from the third channel. In this embodiment, the third channel is free for use, thereby increasing available system bandwidth. The system and method of the present invention contemplates operation with a large number of users, such as would be served in multi-unit housing or a hotel.

Figure 2:
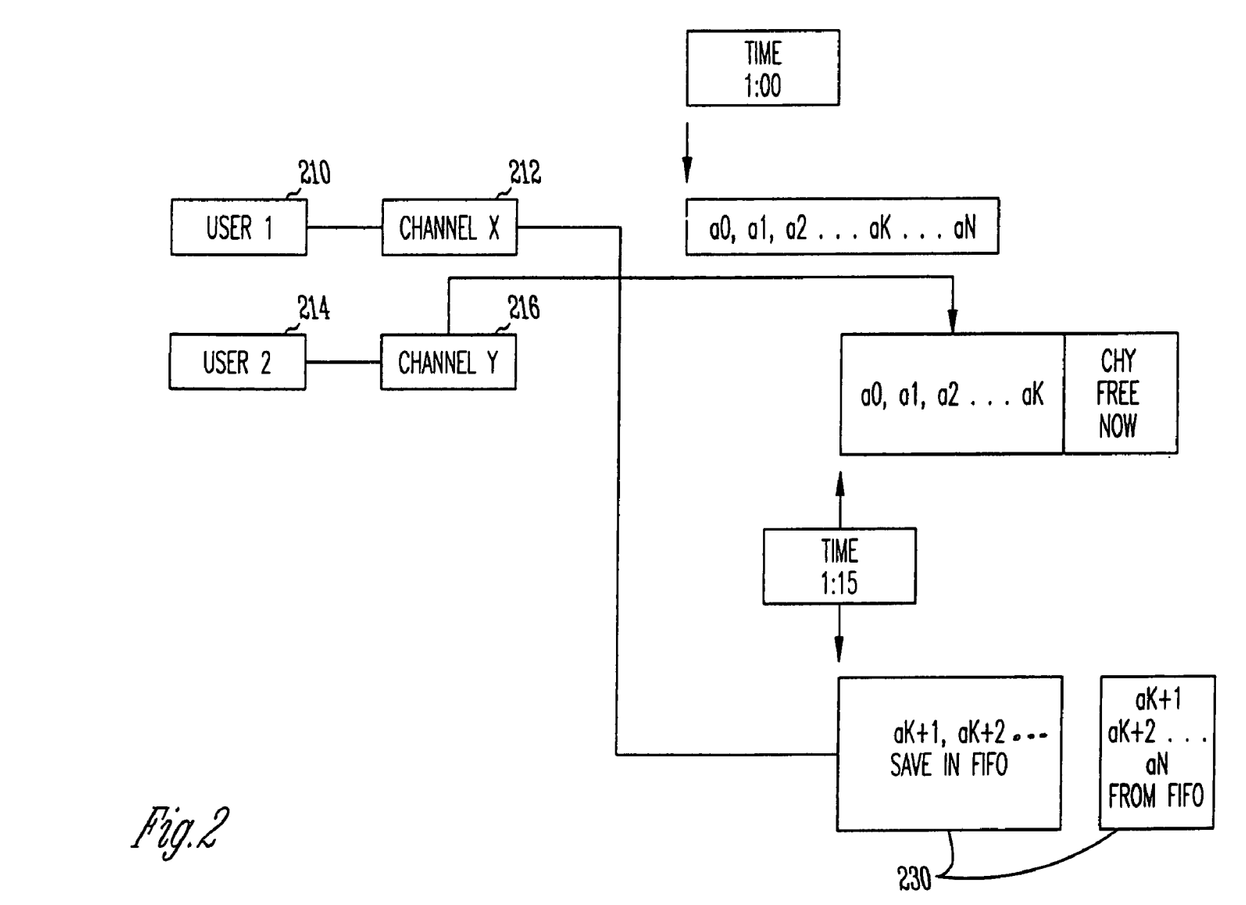
FIG. 2 is a block diagram of an embodiment of the present invention.

Operation of the system is described referring to FIG. 2. Using the example of video on demand, assume a video consists of sections or parts, a. The complete video would be the ordered set {a0, a1, a2, . . . aN}. Now assume that user 1 210 started watching this video at 1:00 on a first channel Channel X 212 and has already watched the subset of video sections {a0, a1, a2, . . . , aK}. Locking mechanism for channel X may consist of counter-X, which may start at an initial value of zero and may be incremented to 1 when user 1 starts watching the video. Now user 2 214 starts watching the same video starting at a0 on a second channel Channel Y 216 but at a later time, say 1:15. The second user 214 would watch sections {a0, a1, a2, . . . , aK} on Channel Y 216. Concurrently, video sections {aK+1, aK+2, . . . , aN} are being delivered to user 1 210 on first channel Channel X 212. User 2 214 has an auxiliary tuner 230 tuned to first channel Channel X 212 to capture video sections {aK+1, aK+2, . . . , aN} in a FIFO buffer while viewing video sections {a0, a1, a2, . . . , aK} on second channel Channel Y 216. In this case, counter-x may be incremented to 2, so that the video on demand service would continue sending sections {aK+1, aK+2, . . . , aN} to the second user, even if the first user stopped watching the video. Once section aK is viewed, user 2 214 starts viewing the remaining sections {aK+1, aK+2, . . . , aN} from the FIFO buffer 230, freeing up second channel Channel Y 216 for another user. As users stop receiving content on channel X, counter-x is decremented until it reaches its terminal count or initial value (0), which indicates that channel X is free to be used by the central broadcast service to send other content. This reduces overall system bandwidth usage. In one embodiment a seamless program is assured by having user 2 view video sections {a0, a1, a2, . . . , aK, aK+1} on second channel Channel Y 216 and start viewing from the FIFO buffer 230 at section aK+2. The locking mechanism associated with the broadcast station and the auxiliary tuner may monitor counter-X and as long as it is not zero, continue the broadcast of the video to assure the video is completely downloaded, even if user 1 210 or any users decide to stop viewing the video.

One skilled in the art would see that by adding additional tuners and FIFO buffers the efficiency of the system would be increased.

Figure 3:
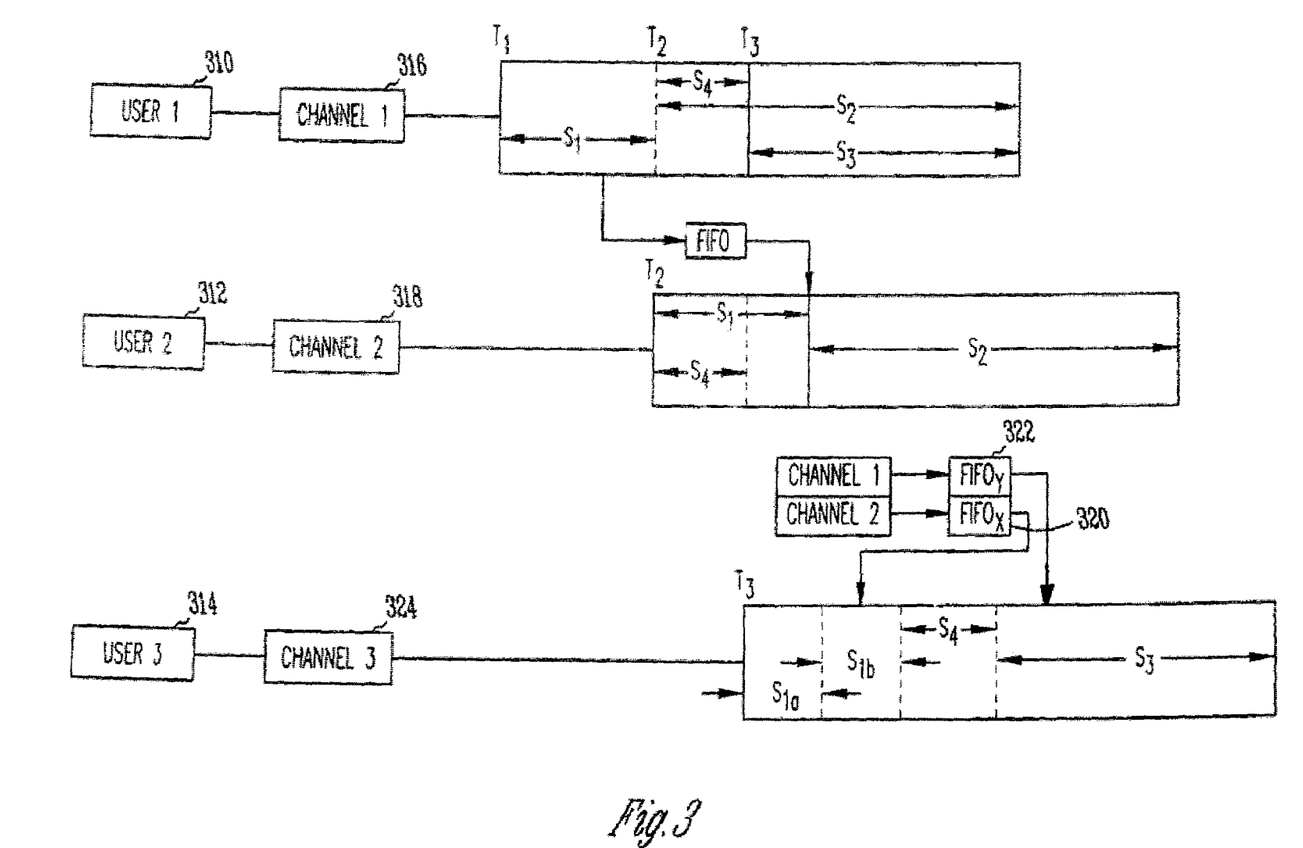
FIG. 3 is a block diagram of an embodiment of the present invention.

In one embodiment, additional tuners and FIFO buffers are added to the system, resulting in a system and method having increased efficiency. Referring to FIG. 3, User location 1 (310), User location 2 (312) and User location 3 (314) are shown. In use, user 1, user 2 and user 3 begin watching movie A at three different times, T1, T2 and T3, respectively. User 1 receives the entire movie on Channel 1 (316). Segment 1 ($S_1$) is the portion of movie A from T1 to T2. User 2 receives Segment 1 on Channel 2 (318). Concurrently User 2 receives Segment 2 on Channel 1 and time shifts Segment 2 using a first FIFO buffer located at user location 2. Channel 2 is only needed for the length of time to show Segment 1.

User location 3 has an auxiliary tuner with two FIFO buffers, FIFO$_x$ (320) and FIFO$_y$ (322). At T3, User 3 starts watching movie A. Channel 3 (324) now transmits the first part of Segment 1 (Segment 1a shown as $S_{1a}$ at FIG. 3) while the second part of Segment 1 (Segment 1b shown as $S_{1b}$ at FIG. 3) is copied from Channel 2 into FIFO$_x$. Then the second part of Segment 1, Segment 1b, is played from FIFO$_x$ to complete Segment 1. During this time, Segment 3 (Segment 3 shown as $S_3$ at FIG. 3) is recorded to FIFO$_y$. After Segment 1 is finished playing, Segment 4 (shown as $S_4$ at FIG. 3) must be sent on Channel 3 since it had already gone by on Channel 1 when User 3 started watching movie A. After Segment 4 is played, Segment 3 (shown as $S_3$ at FIG. 3) is played from $FIFO_y$. In one embodiment, the method described may be a computer based method.

The present invention is directed in one embodiment to a method for providing streaming content including video on demand while conserving system bandwidth. The method comprises providing a system including a central broadcast station and at least two user locations connected to the central broadcast station. The user locations comprise receiving equipment capable of tuning into more than one channel simultaneously and an auxiliary tuner having a first in first out (FIFO) buffer capable of capturing content from a first channel as it presents content from a second channel. In one embodiment, the method is a computer based method.

Figure 4:
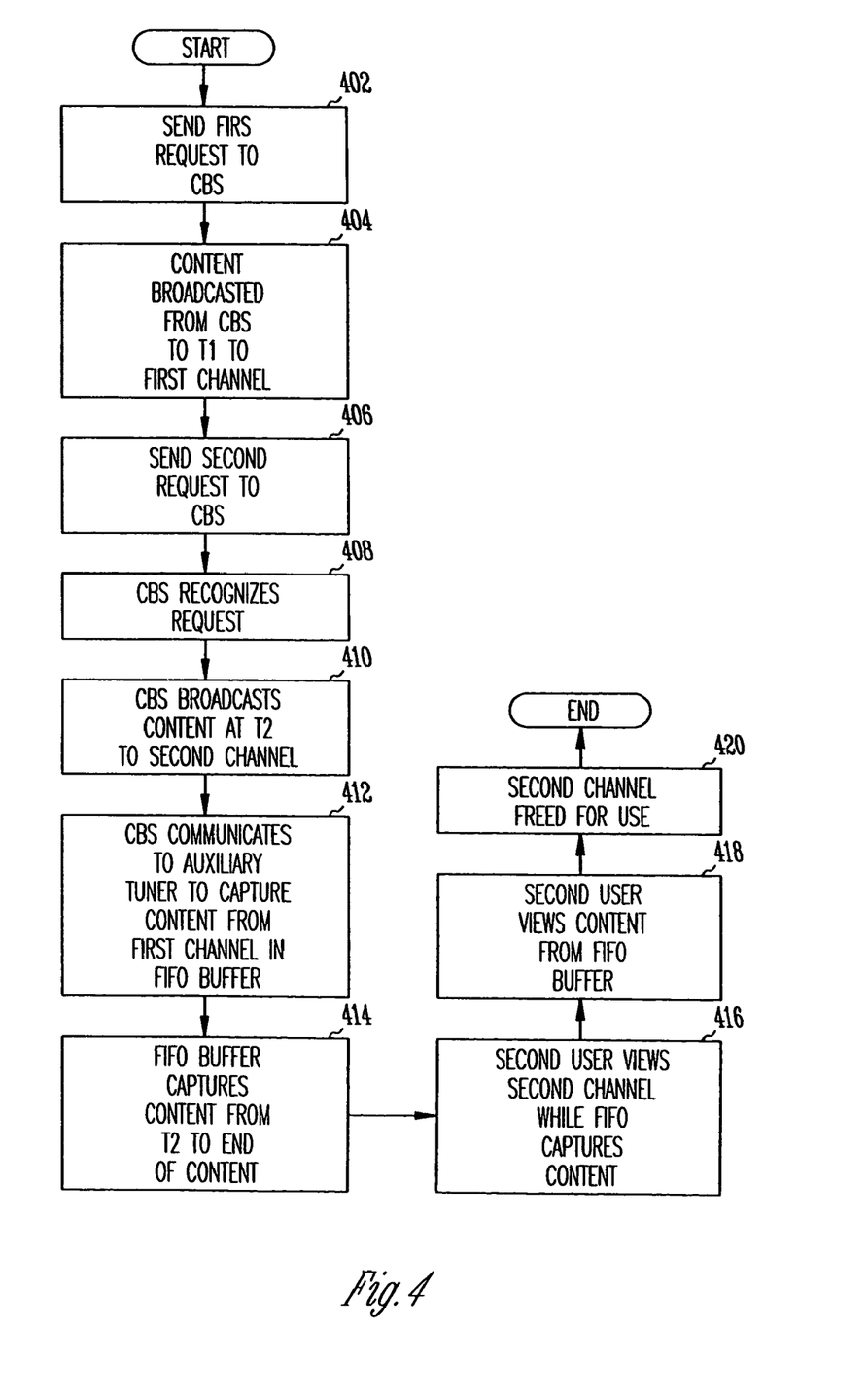
FIG. 4 is a flow chart diagram of one embodiment of the present invention.

As shown in FIG. 4, the method embodiment 400 comprises sending a first request 402 for streaming content from a first user location to the central broadcast station. The requested streaming content is broadcast from the central broadcast station (CBS) to the first user location and a first channel at time T1 in response to the first request as shown at 404. A second request 406 is sent at a later time T2 from a second user location to the CBS for the same streaming content. At 408 the central broadcast station recognizes the second request and then broadcasts 410 starting at time T2 the first portion of the content corresponding in length from T1 to T2 on a second channel to the second user location. The CBS also communicates to the auxiliary tuner of the second user location to capture content from the first channel in the FIFO buffer starting at time T2, as shown at 412.

The auxiliary tuner captures the second portion of the content from the first channel in the FIFO buffer starting at time T2 until the end of the program, 414. The second user views the first portion of the requested content on a second channel while the auxiliary tuner captures the second portion of the content in the FIFO buffer, 416. The second user views the second portion of the content from the FIFO buffer after viewing the first portion of the content from the second channel 418, and the second channel is then freed for use thereby increasing available bandwidth 420.

Figure 5:
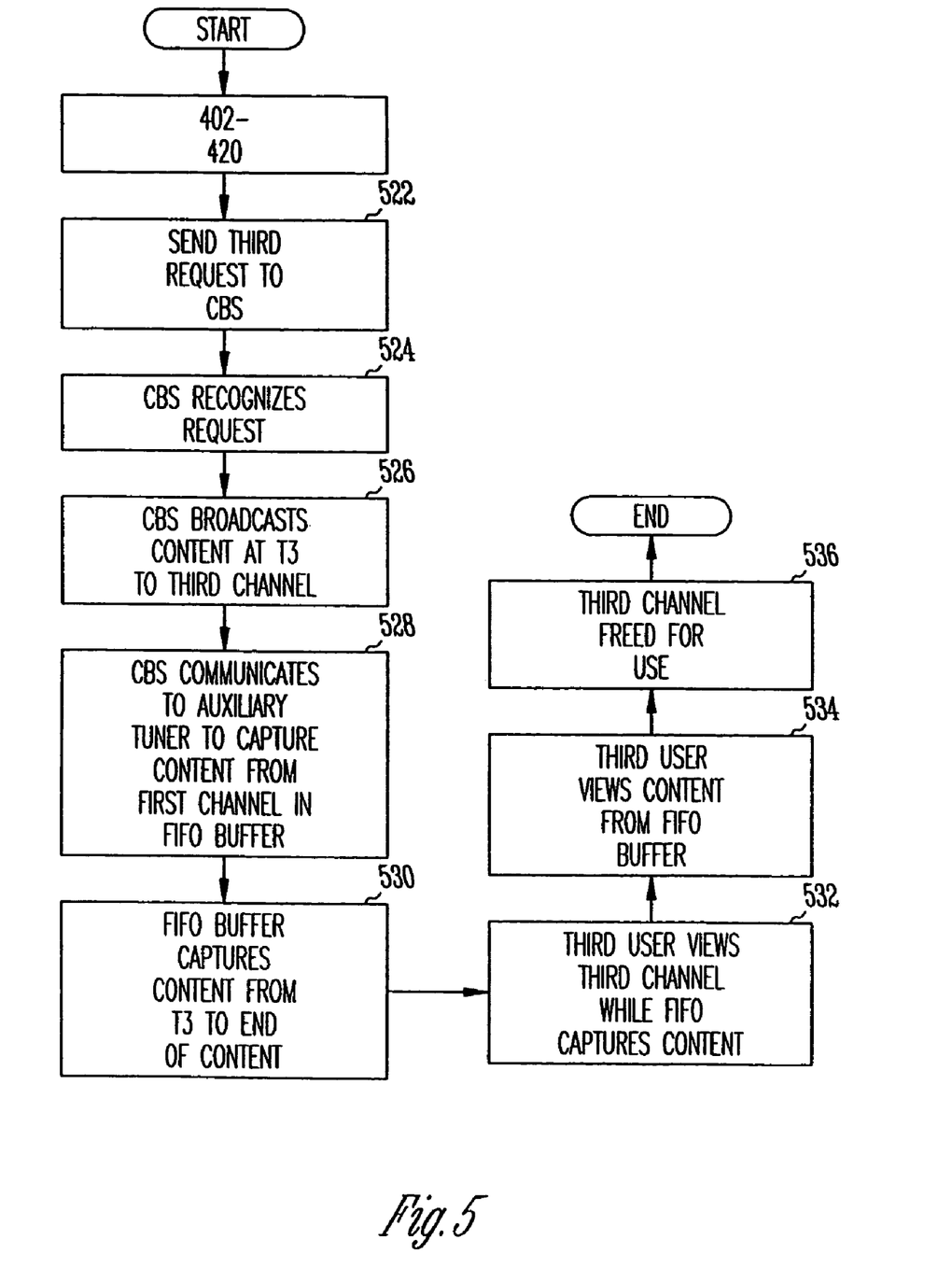
FIG. 5 is a flow chart diagram of yet another embodiment of the present invention.

Referring to FIG. 5, in another embodiment, the method 300 further comprises sending a third request 522 for the same streaming content from a third user location to the central broadcast station. The central broadcast station recognizes the third request 524 and then broadcasts 526 starting at time T3 the third portion of the content corresponding in length from T1 to T3 on a third channel to the third user location. The central broadcasting station also communicates 528 to the auxiliary tuner of the third user location to capture content from the first channel in the FIFO buffer starting at time T3. The auxiliary tuner captures the fourth portion of the content from the first channel in the FIFO buffer starting at time T3 until the end of the program 530. The third user views the third portion of the requested content on a third channel while the auxiliary tuner captures the fourth portion of the content in the FIFO buffer 532. The third user views the fourth portion of the content from the FIFO buffer after viewing the third portion of the content from the third channel 534, and the third channel is then freed for use thereby increasing available bandwidth 536.

Figure 6:
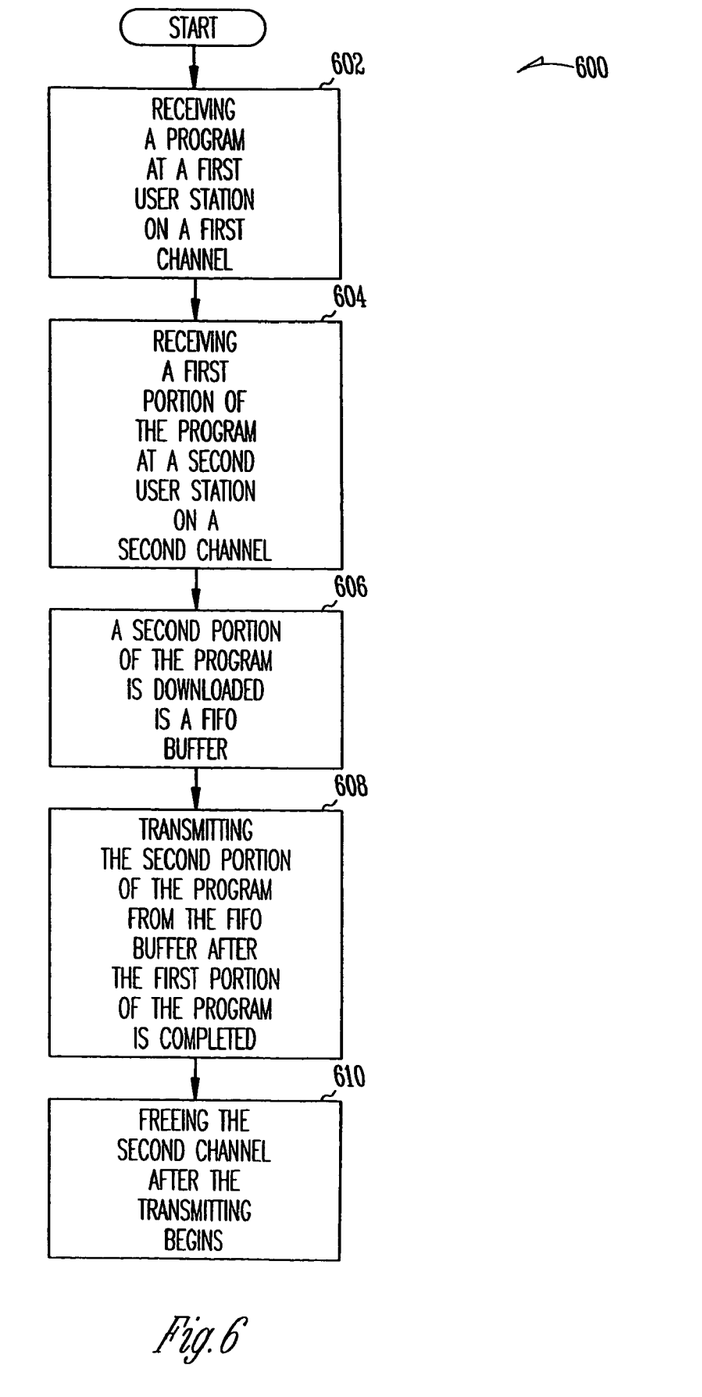
FIG. 6 is a flow chart diagram of still another embodiment of the present invention.

Referring to FIG. 6, a method embodiment 600 for providing streaming content while conserving bandwidth comprises receiving a program at a first user station on a first channel 602, receiving a first portion of the program at a second user station on a second channel 604 while a second portion of the program is captured in a FIFO buffer 606, transmitting the second portion of the program from the FIFO buffer after the first portion of the program is completed 608, and freeing the second channel for use after transmitting begins 610. In one embodiment a locking mechanism ensures that the second portion of the program is completely downloaded from the first channel to the FIFO buffer of the second user location if the first user station stops receiving the program before it ends.

Figure 7:
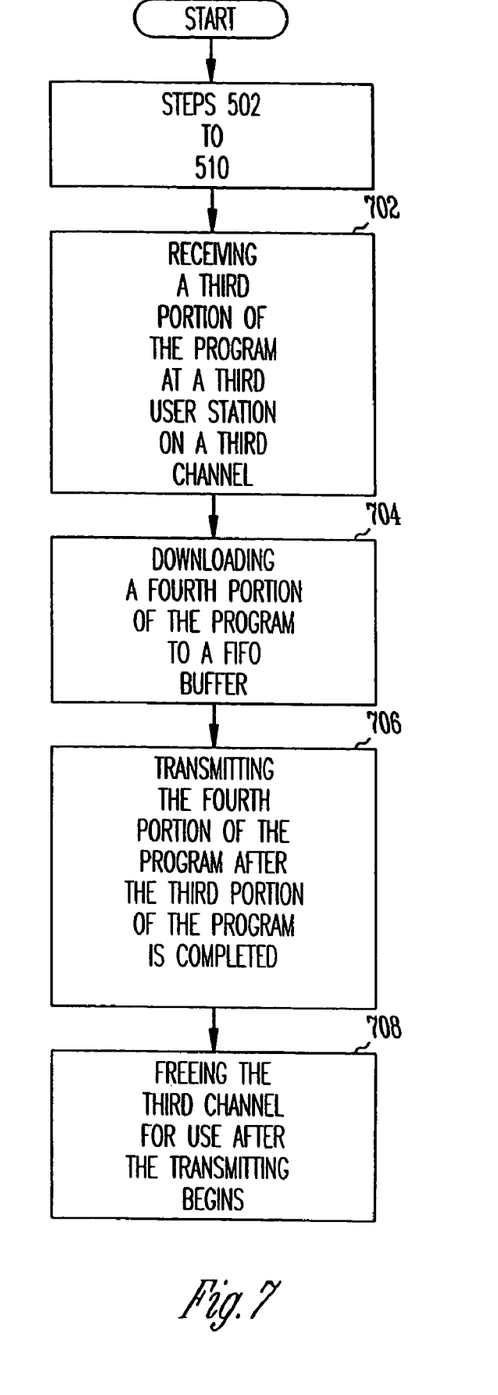
FIG. 7 is a flow chart diagram of another embodiment of the present invention.

In a further embodiment, shown at FIG. 7, the method further comprises receiving a third portion of the program at a third user station on a third channel 702 while a fourth portion of the program is downloaded to a FIFO buffer 704, transmitting the fourth portion of the program from the FIFO buffer after the third portion of the program is completed 706 and freeing the third channel for use after transmitting begins 708. A locking mechanism ensures that the fourth portion of the program is completely downloaded to the FIFO buffer of the third user location if the first user station stops receiving the program before it ends.

Figure 8:
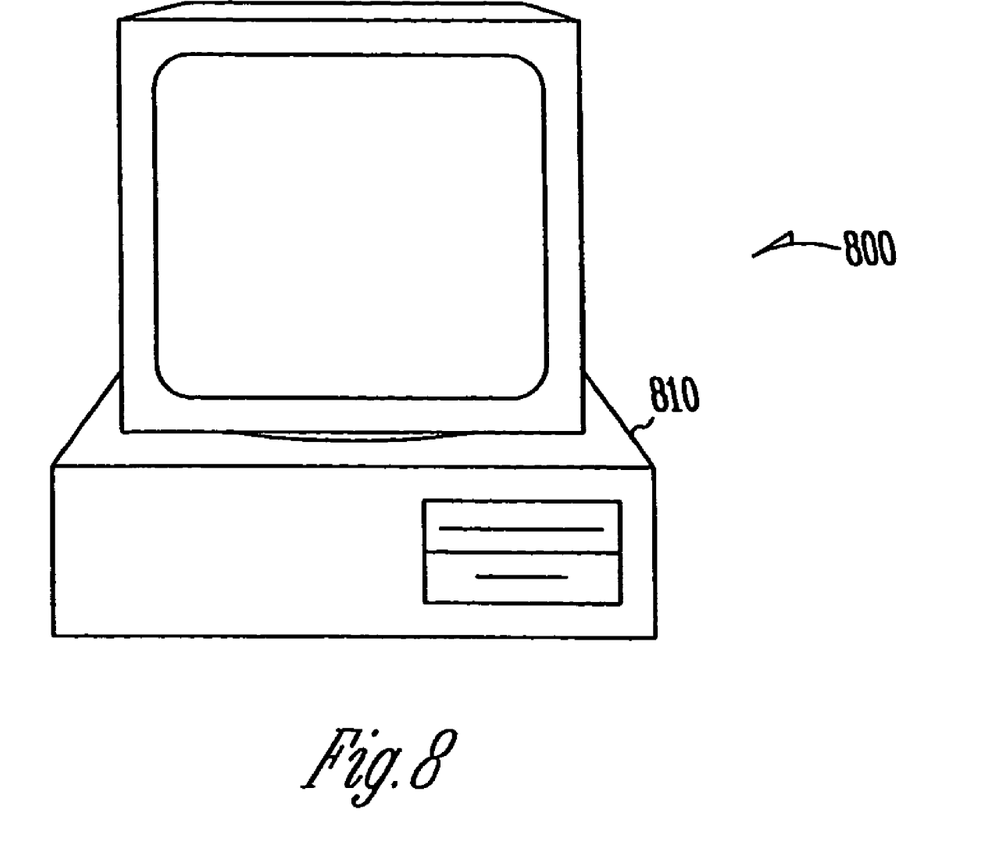
FIG. 8 is a diagram of a computer on which embodiments of the invention may be employed.

The method of the present invention in one embodiment may comprise computer programs written to perform the methods on a personal computer 800 as shown in FIG. 8. The computer programs run on the central processing unit 810 out of main memory, and may be transferred to the main memory from permanent storage via disk drive when stored on removable media or via a network connection or modem connection when stored outside of the personal computer, or via other types of computer or machine readable medium from which it can be read and utilized. The computer programs comprise multiple modules or objects to perform the method. The type of computer programming languages used to write the code may vary between procedural code-type languages to object oriented languages. The files or objects need not have a one to one correspondence to the modules or method steps described depending on the desires of the programmer. Further, the method and apparatus may comprise combinations of software, hardware and firmware as is well known to those skilled in the art.

In conclusion, the present invention provides in various embodiments a system for providing streaming content such as video on demand to multiple users, a receiving station capable of tuning into multiple channels and of buffering data in a FIFO buffer, and methods for broadcasting and receiving streaming content.

The system in one embodiment comprises a central broadcast station and at least two user locations connected to the central broadcast station. Each user location comprises receiving equipment capable of tuning into more than one channel simultaneously and capable of capturing content from at least one content channel as it presents content from a channel other than the channel(s) from which it is capturing content. In one embodiment, each user location comprises an auxiliary tuner having a first in first out (FIFO) buffer for capturing content from the first channel.

In another embodiment, the system comprises a first user location and a second user location. The first user location is capable of receiving a program on a first channel. The second user location is capable of receiving a receiving a first portion of the program on a second channel while a second portion of the program is downloaded to the FIFO buffer of the second user location. The FIFO buffer is capable of transmitting the second portion of the program after the first portion of the program is completed, such that the second channel is freed for use after the transmitting begins. In another embodiment, the system further comprising a locking mechanism capable of ensuring that the second portion of the program is completely downloaded from the first channel to the FIFO buffer of the second user location even if the first user station stops receiving the program before it ends.

In another embodiment, the present invention comprises a method for receiving streaming content, including receiving the streaming content at a first user station on a first channel, receiving a first portion of the streaming content at a second user station on a second channel while a second portion of the streaming content is downloaded to a FIFO buffer, transmitting the second portion of the streaming content from the FIFO buffer after the first portion of the streaming content is completed, and freeing the second channel for use after transmitting begins.

In a still further embodiment, the present invention comprises a computer-readable medium having computer-executable instructions for performing the above described methods.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the invention. It is intended that this invention be limited only by the following claims, and the full scope of equivalents thereof.

What is claimed is:

1. A system for providing streaming content to multiple users, the system comprising:
    a central broadcast station to broadcast streaming content upon receiving a request from a user to view the streaming content;
    wherein the streaming content is a program;
    at least two user locations to receive the streaming content, each of the said at least two user locations comprising receiving equipment capable of tuning into more than one content channel simultaneously and capable of capturing said streaming content from at least one content channel and into a buffer as it presents content from a channel other than the at least one channel from which it is configured to capture content; and
    a locking mechanism associated with each channel, said locking mechanism configured to record the number of users currently capturing content on said each channel and said locking mechanism configured to release said each channel when all user locations are finished receiving content from said each channel, whereby said central broadcast station ceases broadcast of streaming content when no request is received and all channels are released;
    wherein each user location further comprises an auxiliary tuner and said buffer is a first in first out (FIFO) buffer for capturing content from the first channel;
    wherein said at least two user locations comprises a first user location and a second user location, the first user location capable of receiving the program on a first channel, and the second user location capable of receiving a first portion of the program on a second channel while a second portion of the program is downloaded to the FIFO buffer of the second user location from a first channel; and
    wherein the FIFO buffer is capable of transmitting the second portion of the program after the first portion of the program is completed, such that the second channel is freed for use after the transmitting begins;
    the system further comprising a third user station capable of receiving a third portion of the program on a third channel while a fourth portion of the program is downloaded to a first FIFO buffer of the third user station from said second channel, and while a sixth portion of the program is downloaded to a second FIFO buffer of the third user station from said first channel;
    wherein said third portion at least partially overlaps in content with said first portion;
    wherein the first FIFO buffer is capable of transmitting the fourth portion of the program from the first FIFO buffer after the third portion of the program is completed, such that the third channel is freed for use after the transmitting begins;
    wherein after said transmitting of said fourth portion is completed, said third user station receives a fifth portion of the program on said third channel, thus occupying the third channel again;
    wherein the second FIFO buffer is capable of transmitting the sixth portion of the program from the second FIFO buffer after the fifth portion of the program is completed, such that the third channel is freed again for use after the transmitting of the sixth portion begins; and
    wherein the entire program is received and transmitted to the third user station, and the entire program consists of said third, fourth, fifth, and sixth portions.

2. The system of claim 1, wherein said locking mechanism comprises a counter associated with said each channel, said counter initially set to zero and incremented each time a new user location begins to receive content on said each channel and decremented each time a user location ceases to receive content on said each channel.

3. The system of claim 2, wherein said locking mechanism is configured to indicate that said each channel is idle when said counter reaches zero; and wherein no streaming content is broadcasted on said channel where its counter reaches zero.

4. The system of claim 1, wherein said locking mechanism comprises a first counter associated with said first channel whereas said first counter is initially set to zero and said first counter is incremented each time a new user location initiates reception of a part of the program on said first channel and said first counter is decremented for each user location that ceases reception on said first channel and said first channel is free for other uses when said first counter reaches zero.

5. The system of claim 1, wherein said locking mechanism comprises a first counter associated with said first channel whereas said first counter is initially set to zero and said first counter is incremented each time a new user location initiates reception of a part of the program on said first channel and said first counter is decremented for each user location that ceases reception on said first channel and said first channel is free for other uses when said first counter reaches zero.

6. The system of claim 1, wherein:
    each user location is capable of sending a request, to the central broadcast station, for streaming content;
    the central broadcast station is capable of broadcasting requested streaming content to a first user location and a first channel at time T1 in response to a first request for streaming content from a first user location;
    the central broadcast station is capable of recognizing a second request by a second user for the same streaming content and begins to broadcast the content on a second channel at time T2, the central broadcast station further being capable of communicating to the auxiliary tuner at the second user location to capture content from the first channel in the FIFO buffer of the second user location, such that the second user views a first portion of the requested content corresponding in length from T1 to T2 on a second channel while the auxiliary tuner captures a second portion of the content from the first channel starting at T2 to the end of the program in the FIFO buffer of the second user location, such that the second user views the second portion of the content from the FIFO buffer of the second user location after viewing the first portion of the content from the second channel, such that the second channel is freed for use.

7. The system of claim 6, wherein said locking mechanism comprises a counter associated with said second channel whereas said counter is initially set to zero and said counter is incremented each time a new user location initiates reception of a part of the program on said second channel and said counter is decremented for each user location that ceases reception on said second channel and said second channel is freed for use when said first counter reaches zero.

8. A system for providing streaming content to multiple users, the system comprising:
   a central broadcast station to broadcast streaming content upon receiving a request from a user to view the streaming content, wherein the streaming content is a program;
   at least two user locations to receive the streaming content, each of the said at least two user locations comprising receiving equipment capable of tuning into more than one content channel simultaneously and capable of capturing said streaming content from at least one content channel and into a buffer as it presents content from a channel other than the at least one channel from which it is configured to capture content; and
   a locking mechanism associated with each channel, said locking mechanism configured to record the number of users currently capturing content on said each channel and said locking mechanism configured to release said each channel when all user locations are finished receiving content from said each channel, whereby said central broadcast station ceases broadcast of streaming content when no request is received and all channels are released;
   wherein:
   each user location further comprises an auxiliary tuner and said buffer is a first in first out (FIFO) buffer for capturing content from the first channel;
   each user location is capable of sending a request, to the central broadcast station, for streaming content;
   the central broadcast station is capable of broadcasting requested streaming content to a first user location and a first channel at time T1 in response to a first request for streaming content from a first user location;
   the central broadcast station is capable of recognizing a second request by a second user for the same streaming content and begins to broadcast the content on a second channel at time T2, the central broadcast station further being capable of communicating to the auxiliary tuner at the second user location to capture content from the first channel in the FIFO buffer of the second user location, such that the second user views a first portion of the requested content corresponding in length from T1 to T2 on a second channel while the auxiliary tuner captures a second portion of the content from the first channel starting at T2 to the end of the program in the FIFO buffer of the second user location, such that the second user views the second portion of the content from the FIFO buffer of the second user location after viewing the first portion of the content from the second channel, such that the second channel is freed for use; and
   the central broadcast station is capable of recognizing a third request by a third user for the same streaming content and begins to broadcast the content on a third channel at time T3, the central broadcast station further being capable of communicating to the auxiliary tuner at the third user location to capture content from the first channel in a first FIFO buffer of the third user location, such that the third user views a S1a portion of the requested content on the third channel, corresponding to what was viewed at the second user location in length from T2 to T3, while the auxiliary tuner captures a S3 portion of the content from the first channel starting at T3 to the end of the first user viewing of the program in the first FIFO buffer, such that the third user views the S3 portion of the content from the FIFO buffer after viewing the S1a portion of the content from the third channel, such that the third channel is freed for use; and
   wherein between the third user viewing of the S1a portion and the S3 portion, the third user views an S1b portion, which was captured by a second FIFO of the third user location;
   wherein between the third user viewing of the S1b portion and the S3 portion, the third user receives an S4 portion on the third channel; and
   wherein an entire length of the program viewed at the third user location consists of the third portion, the S1b portion, the S4 portion, and the fourth portion.

9. The system of claim 8, wherein said locking mechanism comprises a third counter associated with said third channel whereas said third counter is initially set to zero and said third counter is incremented each time a new user location initiates reception of a part of the program on said third channel and said third counter is decremented for each user location that ceases reception on said third channel and said third channel is freed for use when said third counter reaches zero.

10. A method for providing streaming content, comprising:
   receiving the streaming content at a first user station on a first channel, without time delay, when a first user sends a first request;
   receiving a first portion of the streaming content at a second user station on a second channel, without time delay, when a second user sends a second request;
   while receiving said first portion at a second user station, a second portion of the streaming content is downloaded to a FIFO buffer from said first channel;
   transmitting the second portion of the streaming content from the FIFO buffer after the first portion of the streaming content is completed;
   counting the number of user stations utilizing said first channel with a first counter;
   freeing said first channel when said first counter indicates zero user stations are utilizing said first channel;
   receiving a S1a portion of the streaming content at a third user station on a third channel while a S3 portion of the streaming content is downloaded to a first FIFO buffer of the third user station;
   transmitting the S3 portion of the streaming content to the third user station from the second FIFO buffer, after the S1a portion of the program is completed;
   transmitting a S1b portion of the streaming content to the third user station after the S1a portion is completed and before the S3 portion is transmitted, wherein the S1b portion was captured by a first FIFO of the third user station;
   receiving a S4 portion of the streaming content to the third user station on the third channel after the S1b portion is completed and before the S3 portion is transmitted;
   wherein an entire length of the streaming content consists of the S1a portion, the S1b portion, the S4 portion, and the S3 portion, and wherein the entire length of the streaming content is equivalent to the first and second portions combined;

counting the number of user stations utilizing said third channel with a third counter; and freeing said third channel when said third counter indicates zero user stations are utilizing said third channel.

11. The method of claim 10, and further comprising downloading the entire remaining streaming content from the first channel to the FIFO buffer.

12. A method for providing streaming content, the method comprising:

providing a system comprising a central broadcast station and at least two user locations connected to the central broadcast station, each of said at least two user locations comprising receiving equipment capable of tuning into more than one channel simultaneously and an auxiliary tuner having a first in first out (FIFO) buffer capable of capturing content from a channel selected from a plurality of channels as it presents content from an another channel from the plurality of channels;

sending a first request for streaming content from a first user location to the central broadcast station;

broadcasting requested streaming content from the central broadcast station to the first user location on a first channel at time T1 in response to the first request without time delay;

providing a counter to count uses of said first channel;

initializing said counter to an initial state;

incrementing a counter to indicate a first use of said first channel;

sending a second request for the same streaming content from a second user location to the central broadcast station;

broadcasting a first portion of the content corresponding in length from T1 to T2 by the central broadcast station commencing at time T2 on a second channel to the second user location;

communicating to the auxiliary tuner of the second user location instructions to capture content from the first channel in the FIFO buffer starting at time T2;

incrementing said counter indicating a second use of said first channel; capturing by the auxiliary tuner of a second portion of the content from the first channel in the FIFO buffer staffing at time T2 until the end of the program;

decrementing said counter when said first use of said first channel completes;

decrementing said counter when said second use of said first channel completes;

freeing said first channel for other uses after said counter reaches said initial state;

viewing by the second user of the first portion of the requested content on a second channel while the auxiliary tuner captures the second portion of the content in the FIFO buffer;

wherein broadcasting of the streaming content to the first channel does not take place until after sending of said first request;

sending a third request for the same streaming content from a third user location to the central broadcast station;

recognition by the central broadcast station of the third request;

broadcasting by the central broadcast station commencing at time T3 on a third channel to the third user location, a S1a portion of the content corresponding in length from T2 to T3 of the first portion as viewed at the second user location;

communicating by the central broadcasting station to the auxiliary tuner of the third user location instructions to capture content from the first channel in the FIFO buffer starting at time T3;

capturing by the auxiliary tuner of a S3 portion of the content from the first channel in the FIFO buffer starting at time T3 until the end of the program; and viewing by the third user of the S1a portion of the requested content on a third channel while the auxiliary tuner captures the S3 portion of the content in the FIFO buffer, and while the auxiliary tuner captures a S1b portion of the content from the second channel starting at time T3.

13. A computer-readable medium having computer-executable instructions for performing a method comprising:

receiving streaming content at a first user station on a first channel;

providing a counter to count uses of said first channel;

initializing said counter to an initial state;

incrementing a counter to indicate a first use of said first channel;

receiving a first portion of the streaming content at a second user station on a second channel while a second portion of the streaming content is downloaded to a FIFO buffer;

incrementing said counter indicating a second use of said first channel;

transmitting the second portion of the streaming content from the FIFO buffer after the first portion of the streaming content is completed;

decrementing said counter to indicate when said first user station completes said receiving streaming content;

decrementing said counter to indicate when said second user station completes downloading the second portion of the streaming content;

freeing the first channel for use after said counter reaches said initial state, and the second channel remains free for use until at least one of a plurality of users from a user station sends a request to receive streaming content;

receiving a S1a portion of the streaming content at a third user station on a third channel while a S3 portion of the streaming content is downloaded from the first channel to a second FIFO buffer of the third user station, and while a S1b portion of the streaming content is downloaded from the second channel to a first FIFO buffer of the third user station; and transmitting the S3 portion of the streaming content from the second FIFO buffer after the S1a portion of the streaming content is completed; and receiving a S4 portion of the streaming content at a third user station on a third channel before transmitting the S3 portion, and after viewing of the S1b portion.

14. A machine readable medium having machine readable instructions for executing a method comprising:

providing a system comprising a central broadcast station and at least two user locations connected to the central broadcast station, each of said at least two user locations comprising a primary tuner and an auxiliary tuner, said auxiliary tuner having a first in first out (FIFO) buffer capable of capturing content from a channel from a plurality of channels as it presents content from another channel from the plurality of channels, said central broadcast station having a counter configured to count users of said first channel, said counter initialized to an initial value;

sending a first request for streaming content from a first user location to the central broadcast station;

incrementing said counter to indicate a first use of a first channel;

broadcasting requested streaming content from the central broadcast station to the first user location over said first channel at time T1 in response to the first request;

sending a second request for the same streaming content from a second user location to the central broadcast station at time T2;

broadcasting the first portion of the content corresponding in length from time T1 to time T2 by the central broadcast station commencing at time T2 on a second channel to the second user location;

decrementing said counter after said first user location finishes receiving said streaming content;

communicating by the central broadcasting station to the auxiliary tuner of the second user location instructions to capture content from the first channel in the FIFO buffer staffing at time T2;

capturing by the auxiliary tuner of the second portion of the content from the first channel in the FIFO buffer starting at time T2 until the end of the streaming content;

incrementing said counter to indicate a second use of said first channel;

viewing by the second user of the first portion of the requested content on a second channel while the auxiliary tuner of the second user location captures the second portion of the content in the FIFO buffer;

decrementing said counter after said second user location finishes receiving said streaming content over said second channel;

transmitting from the buffer the second portion of the content;

freeing the second channel for use after said counter reaches said initial value;

sending a third request for the same streaming content from a third user location to the central broadcast station;

broadcasting by the central broadcast station commencing at time T3 on a third channel to the third user location, a S1$a$ portion of the content corresponding in length to at least a part of the first portion;

communicating by the central broadcasting station to the auxiliary tuner of the third user location instructions to capture content from the first channel in the FIFO buffer starting at time T3;

communicating by the central broadcasting station to the auxiliary tuner of the third user location instructions to capture content from the second channel in the FIFO buffer starting at time T3;

capturing by the auxiliary tuner of a S3 portion of the content from the first channel in the FIFO buffer starting at time T3 until the end of the streaming content;

capturing by the auxiliary tuner of a S1$b$ portion of the content from the second channel in the FIFO buffer starting at time T3;

wherein streaming content includes the S1$a$ portion, the S1$b$ portion, and the S3 portion, and these three portions do not overlap each other; and viewing the captured S1$b$ portion and the captured S3 portion of the content from the FIFO buffer.

* * * * *